United States Patent
Brunner et al.

[11] Patent Number: 6,047,629
[45] Date of Patent: Apr. 11, 2000

[54] HYDRAULIC PUMP

[75] Inventors: Rudolf Brunner, Baldham; Georg Neumair, Thalhausen; Gerhard Lorner, Eching, all of Germany

[73] Assignee: Heilmeier & Weinlein Fabrik Fur Oel-Hydraulik GmbH & Co. KG, Munich, Germany

[21] Appl. No.: 09/097,519

[22] Filed: Jun. 15, 1998

[30]   Foreign Application Priority Data

Sep. 23, 1997 [DE] Germany .................. 297 17 022 U

[51] Int. Cl.[7] ........................................ F01B 9/00
[52] U.S. Cl. ........................ 92/140; 92/72; 384/295
[58] Field of Search ..................... 92/72, 140; 384/294, 384/295, 296; 417/470, 471

[56]   References Cited

U.S. PATENT DOCUMENTS 5,937,734  8/1999  Stiefel et al. .......................... 92/129

FOREIGN PATENT DOCUMENTS

| 895 694 | 1/1945 | France . |
| 15 28 407 | 9/1969 | Germany . |
| 41 07 952 | 9/1991 | Germany . |
| 689 587 | 4/1953 | United Kingdom . |

*Primary Examiner*—Edward K. Look
*Assistant Examiner*—Hermes Rodriguez
*Attorney, Agent, or Firm*—Dorn, McEachran, Jambor & Keating

[57]   ABSTRACT

In a hydraulic pump (P) comprising at least one piston pump element whose piston (11) is oriented towards an eccentric (E) of a drive shaft (2), and being equipped between the eccentric (E) and a bearing ring (R) rotatable on the eccentric (E) with an eccentric slide bearing (G) having a bearing bush (B) fixed in the bearing ring (R), the bearing bush (B) and the bearing ring (R) each have molded and locally meshing stop portions (A1, A2) which positively fix the bearing bush (B) in the bearing ring (R) in rotational and axial direction. (FIG. 1).

9 Claims, 1 Drawing Sheet

HYDRAULIC PUMP

The present invention relates to a hydraulic pump of the type specified in the preamble.

Such hydraulic pumps are used in machine building, for instance machine tool building, on a large scale and are equipped with one or a plurality of pump elements, which are driven by a drive shaft, depending on the power requirement or desired delivery rate. The lifting motion of the piston is derived from the eccentric rotation of the eccentric of the drive shaft, the eccentric acting on the piston not directly, but through a bearing ring which is rotatable on the eccentric. The bearing ring is expedient because during operation of the piston forces are generated that occur at points and propagate in the circumferential direction of the eccentric and therefore lead to relatively high non-uniform loads which are compensated by the bearing ring.

In hydraulic pumps of such a type, which are known in practice, the bearing ring is rotatably supported on the eccentric by means of two roller bearings which effect an axial guidance. In radial direction roller bearings require a lot of constructional space and have the disadvantage of a relatively short service life in comparison with slide bearings. It is therefore customary to provide an eccentric slide bearing with a slide bearing bush between the bearing ring and the eccentric. However, since a relative rotational movement between the bearing bush and the bearing ring and an axial displacement of the bearing bush relative to the bearing ring effects wear or damage, the bearing bush is adhesively fixed into the bearing ring. On account of the pointwise and surrounding forces that act on the adhesive connection, it may happen that the adhesive connection detaches, resulting in the above-mentioned damage or wear phenomena so that the service life of the eccentric slide bearing which is per se considerably longer than that of the roller bearings cannot be exploited.

In a piston pump which is known from DE-A41 07 952, the bearing ring has a polygonal outer circumference with which it acts on the pistons. A slide bearing bush consisting of bearing material, which is firmly connected to the bearing ring without any positive connection means, is provided between the shaft eccentric and the bearing ring.

It is known from FR-895 694 that a steel sleeve has fixed in its interior a sleeve with a thinner wall. For fixing purposes longitudinal ribs are provided along the circumference of the thin sleeve and longitudinal grooves in the outer sleeve, the members extending over the whole length of the components fitted into each other, and being in meshing engagement with one another. Alternatively, an end section is expanded outwardly along its whole circumferential extension and is pressed into a corresponding expanded portion of the outer sleeve.

Further prior art is shown in GB-A-689 587 and DE-A-1 528 407.

It is the object of the present invention to provide a hydraulic pump of the above-mentioned type in which the long service life of the eccentric slide bearing can be reliably used.

Thanks to the positively functioning means for preventing rotational and axial movements of the bearing bush in the bearing ring, a long service life of the slide bearing can reliably be exploited despite the high pointwise and propagating forces that are transmitted between the bearing ring and the bearing bush, for the local and positively functioning preventing means cannot become detached during the service life of the slide bearing. The bearing bush remains connected to the bearing ring throughout its service life.

Under simple manufacturing aspects the stop means are local bent portions, as well as receiving portions for the bent portions. Each bent portion can be positoned such that as little usable bearing surface as possible is wasted.

The receiving portions and the bent portions jointly form a means for preventing rotational and axial movement. As a result of such a double function, only one bent portion and one receiving portion, respectively, is needed for the two directions.

The bearing surface of the bearing bush that is wasted is advantageously small, because the bent portion only requires a very small portion of the bearing surface. If at least one bent portion is respectively provided at the two front ends of the bearing bush, both bent portions will cooperate with respect to axial movement prevention in both axial directions. The function of the rotation preventing means could be assumed by one bent portion alone. The two bent portions, however, expediently split the task of a rotation preventing means The bent portions are uniformly distributed in circumferential direction, with the bent portions at one front end cooperating with the bent portions at the other front end for axial movement prevention.

The receiving means fulfills an additional function because it facilitates the penetration of oil into the bearing portion, which is expedient for a long service life of the slide bearing.

The bearing characteristics of the slide bearing are not impaired, for instance by notch stresses, owing to the harmonic extension of the bent portions.

Since the side cheeks, which are normally provided for guiding the bearing ring, impede or render difficult access of lubricating oil to the slide bearing or the discharge of impurities, it is particularly expedient according to claim 8 to form the stop means provided as the rotational or axial movement-preventing means in such a manner that they define uninterrupted oil ducts during the service life of the slide bearing.

An embodiment of the subject matter of the invention shall now be explained with reference to the drawing, in which.

Figure 1:
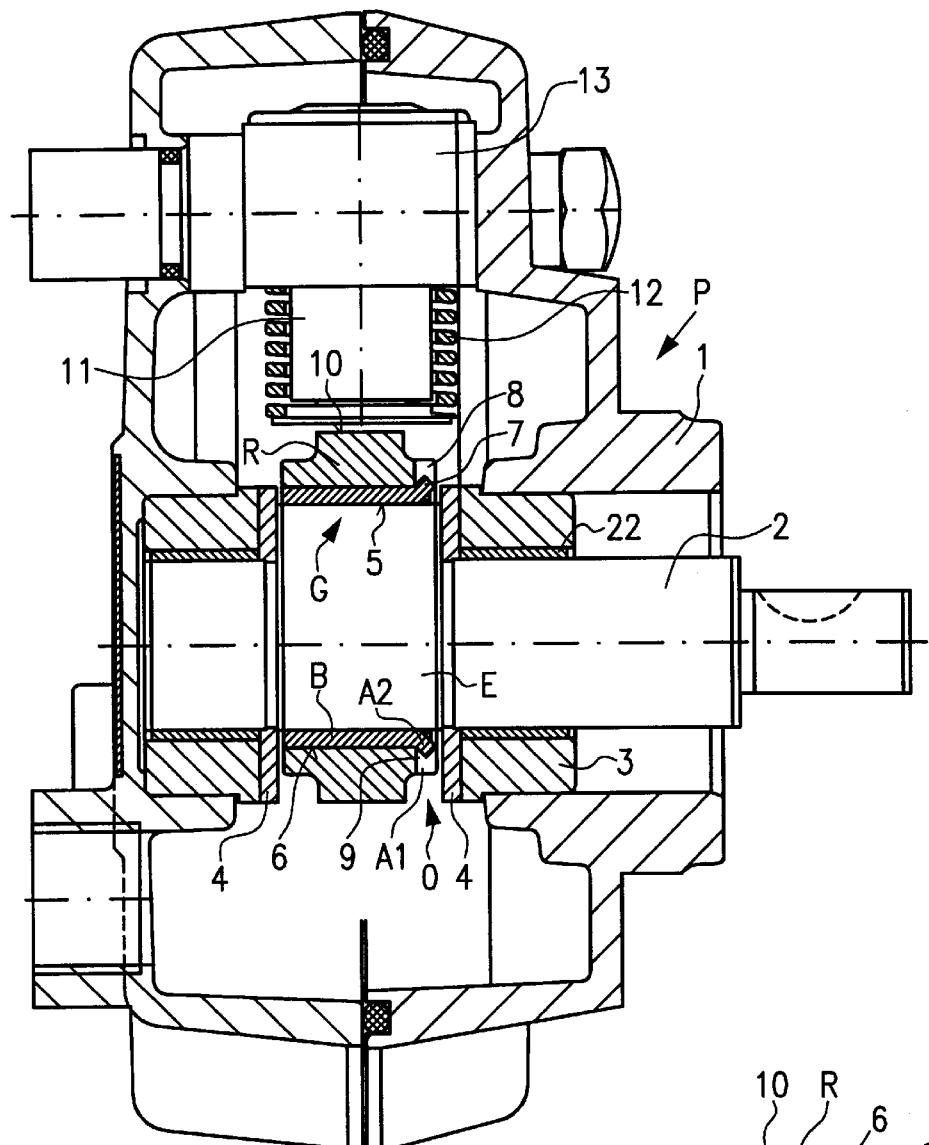
FIG. 1 is an axial section through a hydraulic pump.

A hydraulic pump P comprises a housing which contains a drive shaft 2 which has at least one eccentric E. Eccentric E is either integral with drive shaft 2 or is arranged thereon and secured against rotation. The drive shaft 2 is, for instance, rotationally supported in slide bearings 22 and housing rings 3 and axially positioned. Side cheeks 4, e.g. hardened ring discs, which are seated on the drive shaft 2 are provided at both sides of the eccentric E and serve to guide a bearing ring R which is rotatable on the eccentric E. A slide bearing G is provided on the eccentric E for the bearing ring R, namely a cylindrical bearing bush B of bearing metal (optionally a combination of metal and plastics) which is arranged between the inner circumference 6 of the bearing ring R and the outer circumference 5 of the eccentric E In housing 1, at least one piston-pump element is supported such that the piston 11 thereof is oriented towards a circumferential surface 10 of the bearing ring R. The piston 11 is acted upon by a restoring spring 12 and operates in a cylinder 13 approximately radially with respect to the axis of drive shaft 2. In circumferential direction, a plurality of such axial piston-pump elements can be distributed in housing 1 and are driven by the same eccentric E. It is also possible to provide a plurality of eccentrics E on the drive shaft 2 and to drive a plurality of axially distributed pump elements or pump-element groups with said eccentrics.

In the sliding bearing G the bearing bush B is pressed into the inner circumference 6 of the bearing ring R and is additionally secured in a positive manner against rotation and in axial direction. Locally meshing stop means A1 and A2 which are, for instance integrally molded into the bearing bush B and the bearing ring R, respectively, perform such a securing function.

The stop means A1 of the bearing ring R are inwardly open receiving portions 8 which are each engaged in a positive manner by an outwardly directed bent portion 7 of the bearing bush B. Expediently, the receiving portions 8 are outwardly continuous openings (not shown) or (as shown) approximately radial grooves 9 which are open towards the front ends 19, 20 (FIG. 2) of the bearing ring R.

According to FIG. 1, the stop means A1, A2, i.e., the respective bent portion 7 and its receiving portion 8 or opening 9, form an oil duct 0 which is continuous up to the eccentric E and along which a hydraulic medium or oil inside the housing can pass into the slide bearing G.

Figure 2:
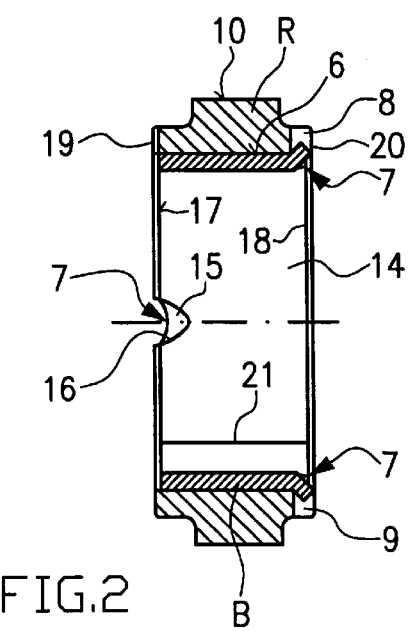
FIG. 2 shows a detail of FIG. 1 in axial section.

According to FIG. 2, a respective bent portion 7 which has assigned thereto a receiving portion 8 in the bearing ring R is provided at each front end 17, 18 of the bearing bush B, which is axially slightly shorter than the inner circumference 6 of the bearing ring. Two bent portions 7 per front end 17, 18 are expediently provided in expediently diametrically opposite fashion, even distributed in circumferential direction. The bent portions 7 at one front end are offset in circumferential fashion relative to the bent portions 7 at the other front end, expediently by about 90°. Each bent portion 7 has an approximately funnel-shaped extension 15, starting from the bearing surface 14 of the bearing bush B. The rotational movement takes place between the bearing surface 14 and the outer circumference 5 of the eccentric E, while the bearing bush B is non-rotatably seated in axially fixed manner in the bearing ring R.

In the contour of the front end 17 and 18, respectively, each bent portion 7 forms a trough 16 which in the extension of the oil duct O promotes the entry of oil to the inside and the discharge of impurities. The oil ducts O are defined by the receiving portions 8, the bent portions 7 and the side cheeks 4. The side cheeks 4 extend to the outside up to or beyond the front ends 19, 20 of the bearing ring R.

It would be possible to provide only a single bent portion further to the inside in the bearing bush and to make the bent portion engage into a receiving portion in the inner circumference 6 of the bearing ring R. This one bent portion alone could form both means for preventing rotational and axial movement.

For reasons of costs the bearing bush B which is made from a strip may have a butt joint 21. The butt joint 21 should expediently be offset relative to the bent portions 7 in circumferential direction. It would also be possible to provide one or a plurality of bent portions in the area of the butt joint 21. Bent portions at the front ends are, however, preferred. The bent portions 7 are, for instance, only pressed after the bearing bush has been pressed into the bearing ring R. However, it would be possible to preform at least the bent portions at one front end and to form only the bent portions at the opposite front end after the pressing operation.

We claim:

1. A hydraulic pump (P) comprising at least one piston pump element whose piston (11) is oriented towards an eccentric (E) of a drive shaft (2), and comprising an eccentric slide bearing (G) which includes a bearing bush (B) fixed in a bearing ring (R) and is disposed between said eccentric (E) and said bearing ring (R) which is rotatable on said eccentric (E), characterized in that said bearing bush (B) and said bearing ring (R) are each provided with molded and locally meshing stop means (A1, A2) which positively fix said bearing bush (B) in said bearing ring (R) in rotational and axial direction.

2. The hydraulic pump according to claim 1, characterized in that said stop means (A2) of said bearing bush (B) is at least one outwardly directed local bent portion (7), and that said stop means (A1) of said bearing ring (R) is at least one inwardly open receiving recess (8) which is engaged by said bent portion (7).

3. The hydraulic pump according to claim 2, characterized in that said bent portion (7) and said receiving means (8) are means for preventing rotational and axial movement at the same time.

4. The hydraulic pump according to at least one of the preceding claims, characterized in that at least one bent portion (7) which engages into a respective receiving portion (8) of said bearing ring (R) is formed at each front end (17, 18) of said bearing bush (B), offset relative to a butt joint portion (21) of said bearing bush (B).

5. The hydraulic pump according to claim 4, characterized in that at least two diametrically opposite bent portions (7) and receiving portions (8) are provided at each front end (17, 18, 19, 20), and that said bent portions (7) and said receiving portions (8), respectively, at one front end are offset in circumferential direction relative to said bent portions and receiving portions, respectively, at the other front end, by about 90°.

6. The hydraulic pump according to claim 2, characterized in that said receiving portion (8) of said bearing ring (R) is an opening which is continuous up to the outer circumference of said bearing ring, as an approximately radially extending groove (9) which is open towards the front end (19, 20) of said bearing ring (R).

7. The hydraulic pump according to claim 2, characterized in that starting from the interior bearing surface (14) of said bearing bush (B), said bent portion (7) expands towards the front end (17, 18) approximately in the manner of a funnel.

8. The hydraulic pump according to claim 2, characterized in that said bent portion (7) in the contour of the front end (17, 18) of said bearing bush (B) forms an oil passage trough (16).

9. The hydraulic pump according to claim 7, characterized in that side cheeks (4) which grip outwards up to the front ends (19, 20) of said bearing ring (R), for instance in the form of hardened circular ring discs, are provided on said drive shaft (2) at both sides of said eccentric (E), and that said receiving portion (8) and said bent portion (7) with one respective side cheek (4) define an oil duct (O) which is continuous from the the outside up to said eccentric (E).

\* \* \* \* \*